(12) United States Patent
Toebes et al.

(10) Patent No.: US 7,738,456 B2
(45) Date of Patent: Jun. 15, 2010

(54) TECHNIQUES TO MAP SWITCH AND ROUTER PORTS TO PHYSICAL LOCATIONS

(75) Inventors: John Toebes, Cary, NC (US); Lisa Bobbitt, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 11/500,738

(22) Filed: Aug. 7, 2006

(65) Prior Publication Data

US 2008/0031241 A1    Feb. 7, 2008

(51) Int. Cl.
*H04L 12/56* (2006.01)

(52) U.S. Cl. .................. 370/392; 370/401; 379/45; 455/414.2; 709/238

(58) Field of Classification Search .......... None
See application file for complete search history.

(56) References Cited

U.S. PATENT DOCUMENTS

| | | | |
|---|---|---|---|
| 4,688,026 A | 8/1987 | Scribner et al. | |
| 5,339,073 A | 8/1994 | Dodd et al. | |
| 5,646,616 A | 7/1997 | Komatsu | |
| 5,850,187 A | 12/1998 | Carrender et al. | |
| 5,887,176 A | 3/1999 | Griffith et al. | |
| 6,111,517 A | 8/2000 | Atick et al. | |
| 6,115,079 A | 9/2000 | McRae | |
| 6,182,146 B1* | 1/2001 | Graham-Cumming, Jr. | 709/238 |
| 6,300,903 B1 | 10/2001 | Richards et al. | |
| 6,539,281 B2 | 3/2003 | Wan et al. | |
| 6,553,489 B1 | 4/2003 | Osler et al. | |
| 6,757,359 B2 | 6/2004 | Stumer et al. | |
| 6,963,282 B1 | 11/2005 | Yeates et al. | |
| 7,057,511 B2 | 6/2006 | Shanks et al. | |
| 7,064,660 B2 | 6/2006 | Perkins et al. | |
| 7,075,412 B1 | 7/2006 | Reynolds et al. | |
| 7,081,819 B2 | 7/2006 | Martinez de Velasco Cortina et al. | |
| 7,103,886 B2 | 9/2006 | Haller et al. | |
| 7,129,837 B2 | 10/2006 | Shannon et al. | |
| 7,205,897 B2 | 4/2007 | Lin | |
| 7,336,175 B2 | 2/2008 | Howarth | |
| 2001/0028308 A1 | 10/2001 | De La Huerga | |

(Continued)

OTHER PUBLICATIONS

International Search Report dated Oct. 13, 2005, from International Application No. PCT/US05/16484.

(Continued)

*Primary Examiner*—Gregory B Sefcheck
*Assistant Examiner*—Salvador E Rivas
(74) *Attorney, Agent, or Firm*—Stolowitz Ford Cowger LLP

(57) ABSTRACT

Techniques for associating a physical location with a network interface on an intermediate network node include receiving a data packet from a device connected to a network. Based on data in the data packet, a particular network interface is determined on a first hop intermediate network node. An identity for an entity that originated the data packet is determined based on data in the data packet. A possible physical location for the entity is determined based on the identity. The identity is associated with the possible physical location in an independent data source that is accessible over the network and different from the data packet. The particular network interface is associated with a highest confidence location for the device based on the possible physical location of the entity and any former locations associated with the particular network interface.

37 Claims, 6 Drawing Sheets

U.S. PATENT DOCUMENTS

| | | | |
|---|---|---|---|
| 2002/0016739 A1 | 2/2002 | Ogasawara | |
| 2002/0136364 A1* | 9/2002 | Stumer et al. | 379/45 |
| 2002/0161907 A1 | 10/2002 | Moon | |
| 2003/0148757 A1* | 8/2003 | Meer | 455/414 |
| 2004/0021569 A1 | 2/2004 | Lepkfker et al. | |
| 2004/0061646 A1 | 4/2004 | Andrews et al. | |
| 2004/0069852 A1 | 4/2004 | Seppinen et al. | |
| 2004/0100383 A1 | 5/2004 | Chen et al. | |
| 2004/0108795 A1 | 6/2004 | Meek et al. | |
| 2004/0128389 A1 | 7/2004 | Kopchik | |
| 2004/0257202 A1 | 12/2004 | Coughlin et al. | |
| 2005/0021626 A1 | 1/2005 | Prajapat et al. | |
| 2005/0093679 A1 | 5/2005 | Zai et al. | |
| 2005/0099270 A1 | 5/2005 | Diorio et al. | |
| 2005/0199716 A1 | 9/2005 | Shafer et al. | |
| 2005/0209947 A1 | 9/2005 | Shafer et al. | |
| 2005/0249225 A1* | 11/2005 | Singhal | 370/401 |
| 2005/0252957 A1 | 11/2005 | Howarth et al. | |
| 2005/0252970 A1 | 11/2005 | Howarth et al. | |
| 2005/0252971 A1 | 11/2005 | Howarth et al. | |
| 2005/0253717 A1 | 11/2005 | Howarth et al. | |
| 2005/0253718 A1 | 11/2005 | Droms et al. | |
| 2005/0253722 A1 | 11/2005 | Droms et al. | |
| 2005/0264420 A1 | 12/2005 | Vogel et al. | |
| 2006/0005035 A1 | 1/2006 | Coughlin | |
| 2006/0010086 A1 | 1/2006 | Klein | |
| 2006/0033606 A1 | 2/2006 | Howarth et al. | |
| 2006/0044111 A1 | 3/2006 | Kollar et al. | |
| 2006/0091999 A1 | 5/2006 | Howarth et al. | |
| 2006/0253590 A1 | 11/2006 | Nagy et al. | |
| 2006/0266832 A1 | 11/2006 | Howarth et al. | |
| 2006/0274752 A1* | 12/2006 | Jain et al. | 370/392 |
| 2007/0013518 A1 | 1/2007 | Howarth | |
| 2007/0027966 A1 | 2/2007 | Singhal et al. | |
| 2007/0080784 A1 | 4/2007 | Kim et al. | |
| 2007/0110031 A1* | 5/2007 | Szeto | 370/352 |

OTHER PUBLICATIONS

Written Opinion of the International Searching Authority dated Oct. 13, 2005, from International Application No. PCT/US05/16484.

H. Schulzrinne, Dynamic Host Configuration Protocol (DHCPv4 and DHCPv6) Option for Civic Addresses Configuration Information, draft-ietf-geopriv-dhcp-civil-05, Internet-Draft, Feb. 19, 2004.

J. Polk et al., Dynamic Host Configuration Protocol Option for Coordinate-based Location Configuration Information, RFC 3825, Jul. 2004.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005.

EPCTM Tag Data Standards Version 1.1 Rev. 1.24, EPCglobal, Standard Specification, Apr. 1 2004, 78 pages.

Global Location Number(GLN) Implementation Guide, Uniform Code Council, Inc., May 2002, 13 pages.

International Search Report dated Feb. 17, 2006, from International Application No. PCT/US05/15322.

Written Opinion of the International Searching Authority dated Feb. 17, 2006, from International Application No. PCT/US05/15322.

Lonvick, C., The BSD Syslog Protocol, RFC 3164, Aug. 2001, 28 pages.

Johnston, M., DHCP Preboot Execution Environment (PXE) Options draft-ietf-dhc-pxe-options-01.txt, Internet-Draft, Jan. 21, 2005.

Johnson, R., TFTP Server Address DHCP Option draft-raj-dhc-tftp-addr-option-00.txt, Internet-Draft, Feb. 6, 2005.

Littlefield, J., Vendor-Identifying Vendor Options for Dynamic Host Configuration Protocol version 4 ( DPHCPv4 ), RFC 3925, Oct. 2004.

Simple Network Management Protocol, Internetworking Technologies Handbook, Chapter-56, printed Jul. 14, 2005.

Harrington, D., et al, An Architecture for DescribingSimple Network Management Protocol (SNMP) Management Frameworks, RFC 3411, Dec. 2002.

Presuhn, R., Editor, Version 2 of the Protocol Operations for the Simple Network Management Protocol (SNMP), RFC 3416, Dec. 2002.

The Global Language of Business, retrieved from the Internet: http://www.ean-int.org/locations.html, [retrieved Mar. 24, 2005].

"Cisco Catalyst 6500 Series Application-Oriented Networking Module", http://www.cisco.com/en/US/products/ps6438/products.sub.--data.sub.--shee- t0900aecd802c1fe9.html Data Sheet, Cisco Systems, Inc. Jul. 13, 2005.

"Cisco Application-Oriented Networking—A Network Embedded Intelligent Message Routing System", http://www.cisco.com/en/US/products/ps6438/prod.sub.--bulletin0900aecd802- c201b.html Product Bulletin No. 2886, Cisco Systems, Inc. Jul. 13, 2005.

"Cisco Catalyst 6500 Series Application-Oriented Networking Module: Large Photo", Photo, Retrieved from the internet: http://www.cisco.com/en/US/products/ps6448/prod.sub.--view.sub.--selector-.html [Retrieved Jul. 13, 2005], Cisco Systems, Inc.

"The EPCglobal Architecture Framework" EPCglobal Final Version of Jul. 1, 2005, pp. 1-53.

Girardot, Marc and Sundaresan, Neel, "Millau: an encoding format for efficient representation and exchange of XML over the web" [Retrieved Jan. 31, 2005]. Retrieved from the internet: http:www9.org/w9cdrom/154/154.html.

Fujitsu Limited, et al., "Web Services Reliability (WS-Reliability) Ver1.0 ", Jan. 8, 2003. pp. 1-45.

Biloruset, Ruslan et al., "Web Services Reliable Messaging Protocol (WS-ReliableMessaging)", Mar. 2004, pp. 1-40.

Mockapetris, P., "Domain Names—Concepts and Facilities", RFC 1034, Nov. 1987.

Mockapetris, P., "Domain Names—Implementation and Specification", RFC 1035, Nov. 1987.

International Search Report dated Jul. 13, 2006, from International Application No. PCT/US05/16319.

Written Opinion of the International Searching Authority dated Jul. 13, 2006, from International Application No. PCT/US05/16319.

R. Droms, Dynamic Host Configuration Protocol, RFC 2131, Mar. 1997.

S. Alexander et al., DHCP Options and BOOTP Vendor Extensions, RFC 2132, Mar. 1997.

G. Stump et al., The User Class Option for DHCP, RFC 3004, Nov. 2000.

Y. T'Joens, DHCP Reconfigure Extension, RFC 3203, Dec. 2001.

M. Patrick, DHCP Relay Agent Information Option, RFC 3046, Jan. 2001.

EPCgl, Frequently Asked Questions, http://www.epcglobalinc.com/about/faqs.html, printed Mar. 24, 2005.

Stolowitz Ford Cowger LLP, Listing of Related Cases, Oct. 8, 2009.

* cited by examiner

TECHNIQUES TO MAP SWITCH AND ROUTER PORTS TO PHYSICAL LOCATIONS

BACKGROUND OF THE INVENTION

1. Field of the Invention

The present invention relates to switches and routers at an edge of a network, and, in particular, to associating their ports with physical locations of devices attached to those ports.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a network node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. The header includes information such as the source of the packet, its destination, the length of the payload, and other properties used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. A network node that determines which links to employ based on information in the internetwork header (layer 3) is called a router.

In many buildings, a router or switch with multiple network interfaces, called ports, is housed in a closet. Cables are laid as communication links from that closet through one or more walls and floors to outlets, called jacks, distributed across one portion of the building, such as one storey or one section of one storey. The cables' terminals in the closet are connected to ports on the router or switch. The cables are out of sight once laid and can not be tracked easily from the closet to the jacks. When a device is to be connected to the network, it is placed in a location in the building and a cable connects it to a convenient jack. In the closet, it is not necessarily apparent which cable terminal and port is associated with the jack and connected device. With only one device connected, power levels on the cable and port can be used to indicate the active port and associate that port with the connected device. With dozens of devices connected it is considerably more difficult to determine which port is associated with which device.

Building and maintaining maps of the physical wiring port layouts is a necessary task for information technology (IT) groups during network establishment and maintenance. People rarely move cables once they are installed, but lots of effort is needed to run and label cables, as well as any additions and changes to the wiring. However, over the occupancy life of a building many adds, moves, and changes occur in the network. To keep current the mapping of jacks to closet terminals and intermediate node ports, continuous, time-consuming and labor intensive manual updates are made. Computer programs and databases have been developed to record this information, such as Cisco Discovery Protocol (CDP) available from Cisco Systems, Inc., of San Jose, Calif. However, the source of the information still involves persons at each end of the hidden cable, either one person walking back and forth or two people working together, and manually plugging and unplugging cables from ports, and devices and test equipment (such as ringers) from jacks. If an update is omitted it can take days and months until the omission becomes apparent, often at an inopportune moment, such as during a crisis caused by equipment failure.

The most popular current method is to statically tag the jacks at the office/cube site and the corresponding rack/port in the wiring closet when the cable is pulled. This method does not have a self-correcting check when wires are crossed, tags lost, or new wires laid. To maintain the database, testing of each port for a connection to a specific device is done when needed. This manual testing is time consuming as the device at the each end must be manually verified for the mapping to be correct.

In the wireless world, location is determined by the end device association to the localized access point. This does not work in wired environments because the switches do not have to be in the vicinity of the end user. Some devices have geo-location systems, such as the Global Positioning System (GPS). However, these devices typically do not have the spatial resolution needed to distinguish cubicles and rooms from each other.

Furthermore, with the increased use of internet telephony, an emergency call can be placed. Without reliable information on the physical location of the end device where the call was placed, emergency responders cannot be directed automatically to the correct room to provide aid. Human life and health can depend on the accuracy of the information that maps ports to jacks.

Based on the foregoing, there is a clear need for techniques that automatically and quickly determine a physical location of devices connected to a port on an intermediate network node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for associating a physical location with a device connected to a network interface on an intermediate network device. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of end nodes connected to built-in jacks that themselves are connected by hidden cables wired to a router in a closet in the same building. However, the invention is not limited to this context. In other embodiments, one or more devices to locate are themselves intermediate network nodes, connected by hidden or non-hidden cables, or one or more devices are wireless access points or devices communicating therewith in a network in the same or different building.

1.0 NETWORK OVERVIEW

Figure 1A:
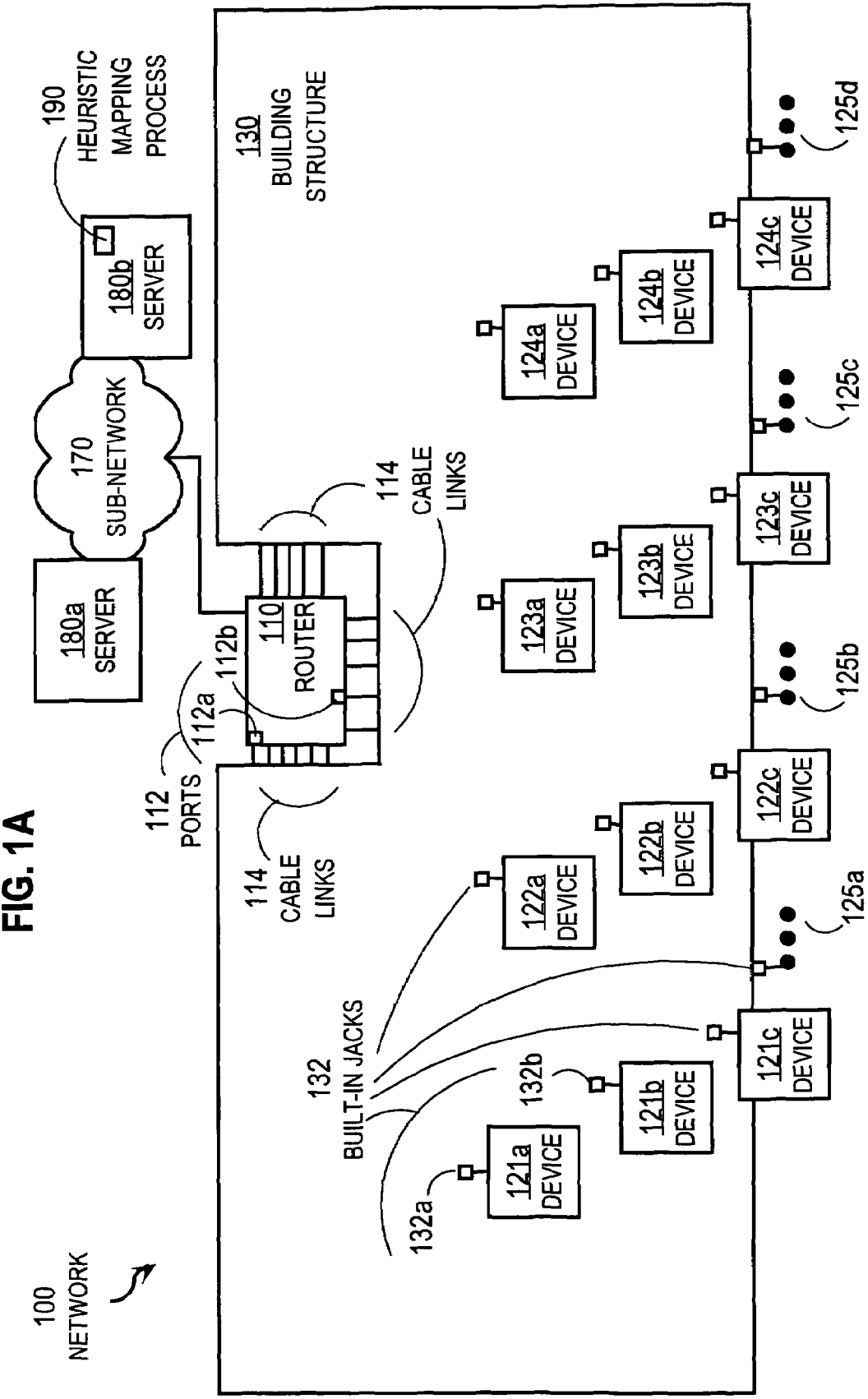
FIG. 1A is a block diagram that illustrates a network that automatically determines locations of devices connected to an intermediate network node by cables wired through a building structure, according to an embodiment.

FIG. 1A is a block diagram that illustrates a network 100 that automatically determines locations of devices connected to an intermediate network node by cables wired through a building structure, according to an embodiment. The network 100 includes subnetwork 170 and router 110 connected to subnetwork 170.

The subnetwork 170 includes or is connected to one or more network nodes (e.g., router 110). The network nodes include both wired and wireless intermediate network nodes and wired and wireless end nodes. The subnetwork 170 include any network that connects network nodes, including, but not limited to, local area networks (LANs), wireless networks, wide-area networks (WAN), the Internet (a network of heterogeneous networks using the Internet Protocol, IP), and virtual private networks. For the purposes of illustration, subnetwork 170 is a wired campus network connecting several building on one campus for an enterprise.

Network 100 also includes server 180*a* and server 180*b* (collectively referenced hereinafter as servers 180) that communicate over subnetwork 170. The client-server model of computer process interaction is also widely known and used. According to the client-server model, a client process sends a message including a request to a server process, and the server process responds by providing a service. The client and server typically operate at the application layer (layer 7) of the OSI model. The server process may also return a message with a response to the client process. Often the client process and server process execute on different devices, called hosts, and communicate via a network using one or more lower layer protocols for network communications. The term "server" is conventionally used to refer to the process that provides the service, or the host on which the process operates. Similarly, the term "client" is conventionally used to refer to the process that makes the request, or the host on which the process operates. In addition, the process performed by a server can be broken up to run as multiple processes on multiple hosts (sometimes called tiers) for reasons that include reliability, scalability, and redundancy. As used herein, the terms "client" and "server" refer to the processes, rather than the hosts, unless otherwise clear from the context. Thus servers 180 execute on one or more hosts (not shown) connected to subnetwork 170.

The router 110 includes multiple ports 112 including port 112*a* and port 112*b*. The ports 112 are connected by cable links 114 to built-in jacks 132 in building structure 130 for communicating data packets with devices connected to those jacks 132. Building structure 130 represents any structure that causes cable links 114 to be inaccessible or otherwise hidden from view, such as a floor, wall, ceiling or other covering. Although sixteen cable links 114 for sixteen built in jacks 132 are depicted for purposes of illustration, in other embodiments more or fewer cable links connect one or more routers or switches to more or fewer built-in jacks through one or more building structures 130. It is further assumed, for purposes of illustration, that the built-in jacks 132 are in different portions of the building, such as different cubicles or rooms, so that devices connected to the jacks 132 and users of those devices are not readily visible to each other.

Network 100 includes devices 121*a*, 121*b*, 121*c*, 122*a*, 122*b*, 122*c*, 123*a*, 123*b*, 123*c*, 124*a*, 124*b*, 124*c*, and other devices represented by ellipses 125*a*, 125*b*, 125*c*, 125*d* (collectively referenced hereinafter as devices 120). Devices 120 are connected to built-in jacks 132 and communicate with subnetwork 170 through ports 112 on router 110. In some embodiments, devices 120 are end nodes, such as desktop or laptop computers, VoIP telephone sets, printers, servers, storage devices, and function specific IP-connected devices (e.g., sensors, alarms, stereos, clocks, security devices). In other embodiments, one or more of devices 120 are intermediate network nodes connected to still more devices. For example, in an illustrated embodiment some built in jacks 132 are connected to wireless access points to which multiple devices represented by ellipses 125*a*, 125*b*, 125*c*, 125*d* communicate with subnetwork 170 through router 110.

According to an illustrated embodiment, heuristic mapping process 190 is included in server 180*b* for associating ports (such as ports 112) on intermediate network nodes (such as router 110) with locations (such as building coordinates of jacks 132). It is assumed for purposes of illustration that building coordinates include a building number, a storey number, and a two-dimensional horizontal grid coordinate with 5 foot resolution for each storey. In other embodiments, other location conventions are used. The association can be used for any purpose. For example, in some embodiments, the association is used to determine which cubicle is serviced by port 112*a*. As a further example, in some embodiments, the association is used to determine which port services the cubicle where device 121 a resides.

Although heuristic mapping process 190 is shown as a single process as part of a particular server 180b for purposes of illustration, in other embodiments one or more portions of process 190 are executed within one or more servers on the same or different hosts of subnetwork 170 or on router 110.

Figure 1B:
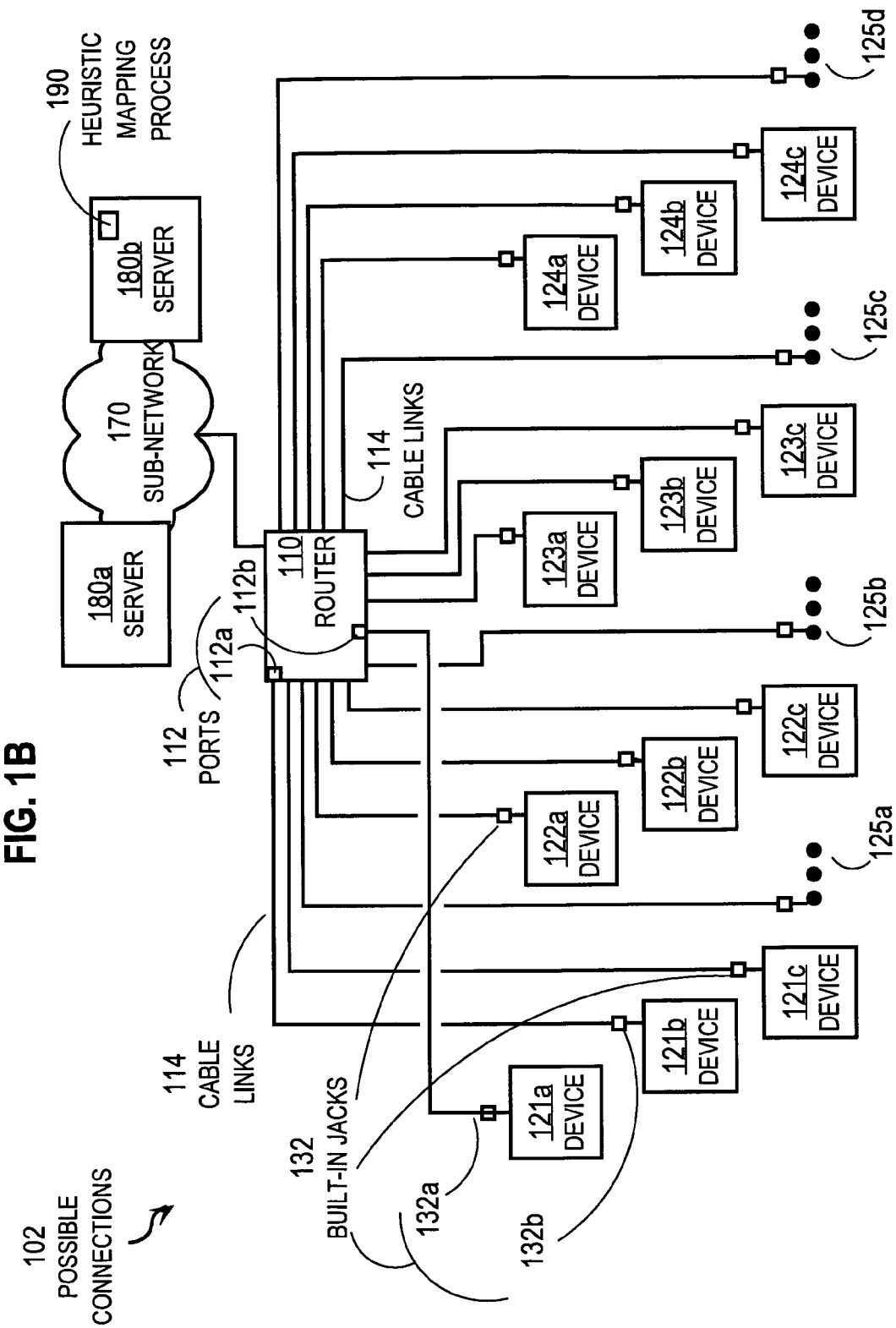
FIG. 1B is a block diagram that illustrates possible connections to locations of devices connected to an intermediate network node by cables wired through a building structure, according to an embodiment.

FIG. 1B is a block diagram that illustrates possible connections 102 to locations of devices 120 connected to an intermediate network node 110 by cables 114 wired through a building structure, according to an embodiment. The elements are as described above for FIG. 1A except that the building structure 130 has been removed to reveal the connections made by cable links 114. These connections represent associations between ports 112 on router 110 and building coordinates of built-in jacks 132 where devices 120 are located. As can be seen in FIG. 1B, the location associated with port 112a is the location of the built-in jack in the cubicle used by device 121b. Similarly, the location of the built-in jack in the cubicle used by device 121a is associated with the port 112b. In the illustrated embodiments, the heuristic mapping process 190 detects these associations even in the case of devices 120 moving from one location (jack) to another or after re-wiring due to changes or repairs.

2.0 PORT CONFIDENCE DATA STRUCTURE

Figure 2:
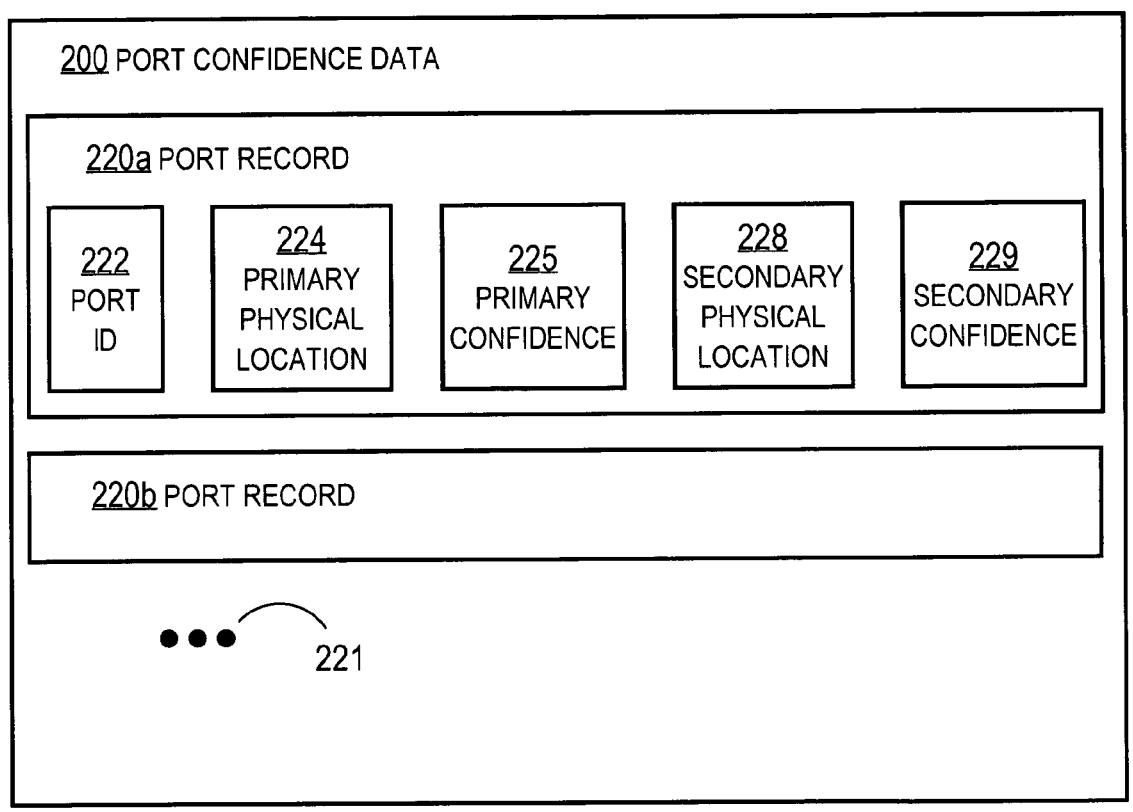
FIG. 2 is a block diagram that illustrates a port confidence data structure for associating a highest confidence location for a device connected to an intermediate network node, according to an embodiment.

FIG. 2 is a block diagram that illustrates a port confidence data structure 200 for associating a highest confidence location with a device connected to an intermediate network node, according to an embodiment.

Port confidence data structure 200 holds data that helps to determine a highest confidence location for a device connected to a port on an intermediate network node. As used herein, confidence is an arbitrary measure that increases as more data packets indicate the same location for the device connected to a port, and decreases as more data packets indicate a different location for that device. The use of data structure 200 is described in more detail in the next section.

In the illustrated embodiment, the port confidence data structure 200 includes port records 220a, 220b and others indicated by ellipsis 221 (collectively referenced hereinafter as port records 220). There is a separate port record 220 for each port on an intermediate network router that is connected to devices for which a highest confidence location is to be determined.

Each port record 220 includes a port identifier (ID) field 222, a primary physical location field 224 and a primary confidence field 225 associated with the primary physical locations field 224. In the illustrated embodiment, each port record also includes secondary physical location field 228 and a secondary confidence field 229 associated with the secondary physical locations field 228. In other embodiments there are more or fewer pairs of physical location fields and confidence fields.

The port ID field 222 holds data that indicates the particular port on a particular intermediate network node. Any method may be used to identify the port. In some embodiments a media access control MAC address for the port is used. The MAC address is a unique number for a network component across all manufacturers of standardized network equipment. In some embodiments a MAC address for the intermediate network node (e.g., router 110) is used along with a relative port number. In some embodiments, the Port ID field 222 includes one or more IP addresses.

The primary physical location field 224 and the secondary location field 228, and any other physical location fields included in port record 220, hold data that indicates physical locations, such as building coordinates for cubicles in a building. The primary confidence field 225 and the secondary confidence field, and any other confidence fields included in port record 220, are paired with a physical location field. For example, fields 225, 229 are paired with fields 224, 228, respectively. The confidence fields, e.g., fields 225, 229, hold data that indicates a measure of confidence. Any method may be used to define a confidence measure. For example, in an illustrated embodiment, a value of zero can be assigned to a lowest confidence and a value of 200 to a highest confidence, with a value of 100 indicating neutral confidence. Note that the illustrated confidence measure is not a percent certainty. A physical location with a higher confidence value is considered a more probable location for the device connected to the port.

The primary physical location field 224 holds data that indicates the physical location that has the highest confidence value. The confidence value is stored in the primary confidence field 225. The secondary physical location field 228, if present, holds data that indicates the physical location that has the next highest confidence value. The confidence value is stored in the secondary confidence field 229.

Although data structure 200, records 220 and fields 222, 224, 225, 228, 229 are shown as contiguous portions of a memory in a particular order for purposes of illustration, in other embodiments one or more portions of data structure 200, records 200 and fields are stored in a different order or in non-contiguous portions of one or more memory devices, with or without pointers to distant memory locations. For example, in some embodiments, each edge node keeps its own port confidence data structure. In the illustrated embodiment, the heuristic mapping process 190 maintains a port confidence data structure 200 for all intermediate nodes on the edge of network 100.

In particular, it is noted that the primary physical location field 224 and primary confidence field 225 need not be the first two fields after the port ID field 222 and device ID field 223 (if present). Instead, a series of location-confidence field pairs (called entries, herein) can hold data for as many locations as the process 190 is designed to track. Rather than move the data contents as the values of confidence rise and fall, in some embodiments a pointer (not shown) or flag (not shown) in the port record 220 indicates the primary entry in the series of entries. In some embodiments, the primary entry is determined as needed by comparing the confidence values in all entries to find the highest.

3.0 METHOD TO ASSOCIATE LOCATIONS WITH PORTS

Figure 3:
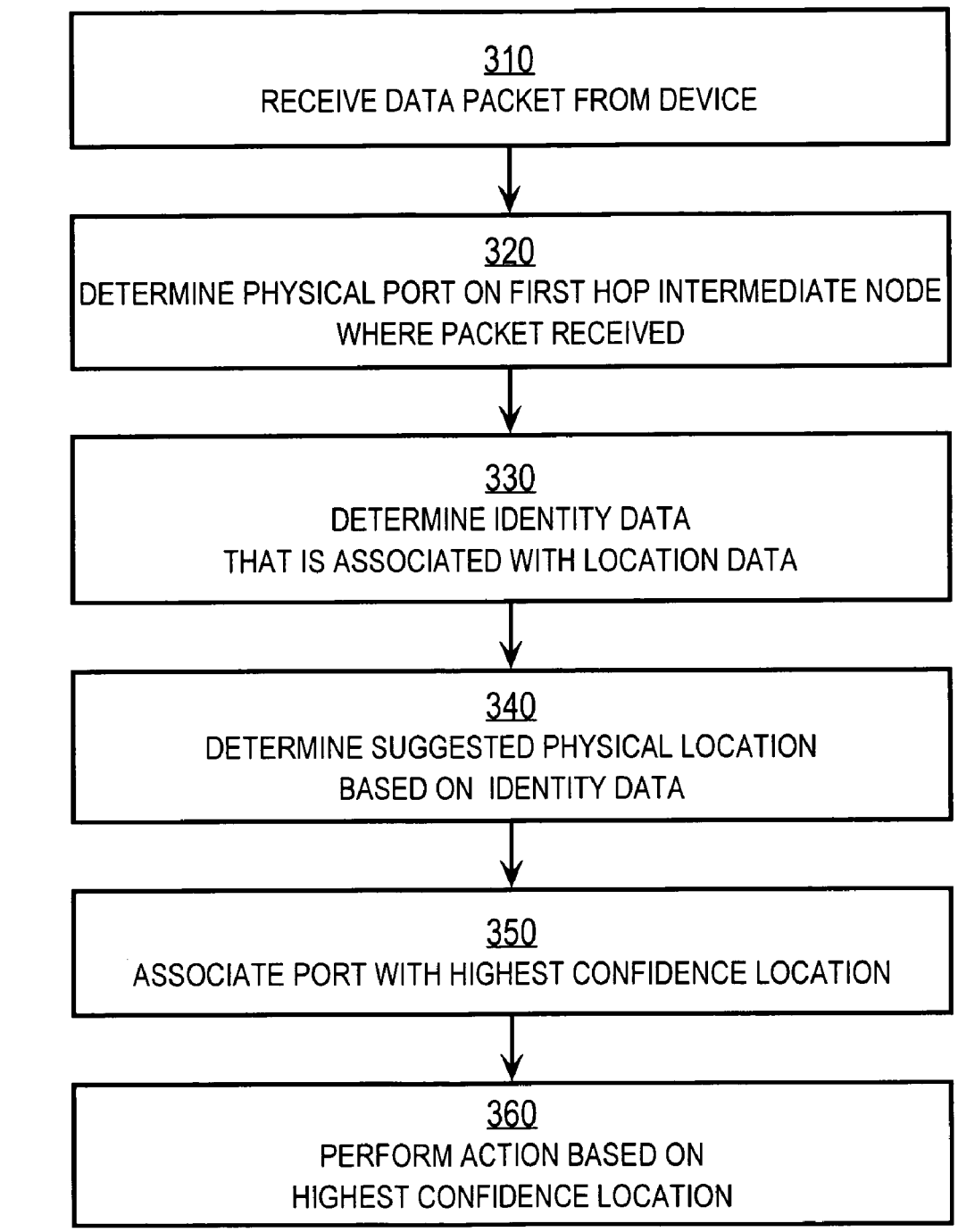
FIG. 3 is a flow diagram that illustrates at a high level a method for associating a port with a highest confidence location for a device connected to an intermediate network node, according to an embodiment.
Figure 4:
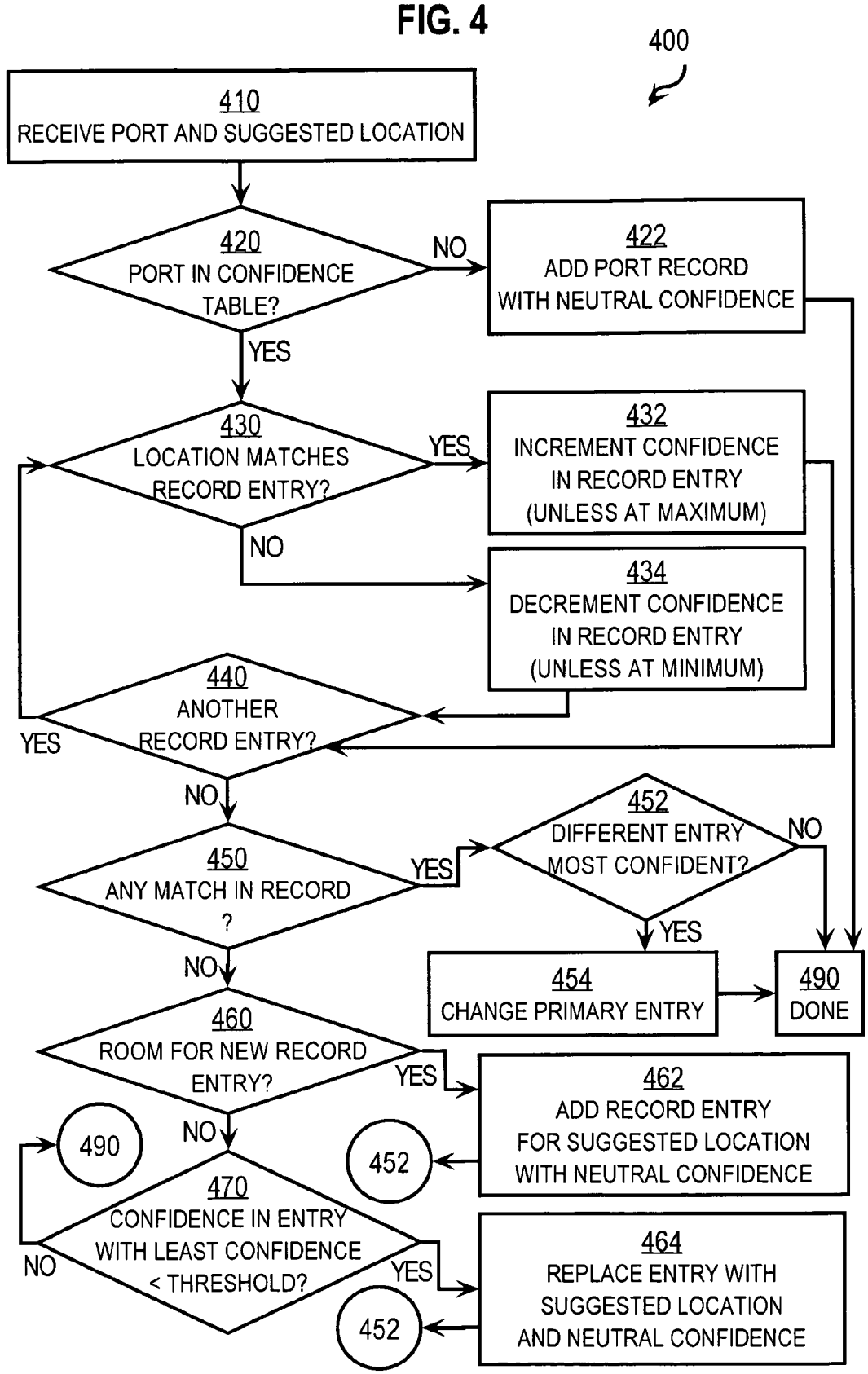
FIG. 4 is a flow diagram that illustrates a method for performing a step of the method of FIG. 3, according to an embodiment.

A method for heuristic mapping process 190 is described in this section with reference to flow diagrams in FIG. 3 and FIG. 4. Although steps in these diagrams are presented in a particular order for purposes of illustration, in other embodiments, one or more steps are performed in a different order or overlapping in time, by one or more processes running in series or in parallel, or one or mores steps are omitted or the method is changed in some combination of ways. Some steps may be performed by different portions of the heuristic process executing at different nodes of the subnetwork 170 or on router 110, or on a switch (not shown) connected to built-in jacks 132 instead of router 110.

3.1 Method at Device Location Server

FIG. 3 is a flow diagram that illustrates at a high level a method 300 for associating a highest confidence location with a device connected to an intermediate network node, according to an embodiment. In step 310 a data packet is received from a device 120 connected to a port (e.g., port 112a) of the intermediate network node (e.g., router 110). Information about the data packet is retained for use by the heuristic mapping process. Example information includes the time the data packet is received (e.g., 2 PM, Jun. 9, 2006, the port it was received on (e.g., port 112a), the IP source address (e.g., 192.2.1.111) in the layer 3 header, and any user identities in the application layer header, such as an email address, a calendar system identifier, and a VoIP telephone number.

In step 320 a physical port (e.g., port 112a) through which the packet was received on a first hop intermediate node (e.g., router 110) is determined. The first hop intermediate node is the switch or router that received the data packet earlier than any other intermediate network node in the network.

Any method may be used to determine the port. For example, in some embodiments, the portion of the heuristic mapping process 190 represented by step 320 is performed on the intermediate node at the edge of the network, e.g., router 110. The MAC address of the port (e.g., 112a) is known by the first hop intermediate node. The MAC address of the device 120 is in the layer 2 header of the data packet. The link layer learning at the intermediate node associates the MAC address of the device with the port. The port is identified by its MAC address or a relative port number (e.g., port 1) on the router/switch and the MAC address of the router/switch. For example, the port is identified as port 112a on router 110.

In some embodiments the portion of the heuristic mapping process 190 represented by step 320 is performed on a different node in the subnetwork 170. In some embodiments, the different node is in the route. In some embodiments, data from the data packet, including the IP address is forwarded to the node, e.g., to the node where the process 190 executes within server 180b. In such embodiments, only the IP source address of the device in the layer 3 header is known by the node, because the MAC address in the layer 2 header was updated on each hop. In some such embodiments, the well-known Address Resolution Protocol (ARP) is used to convert the IP source address in the layer 3 header to the corresponding physical layer address, e.g., the MAC address of the port. The intermediate node (e.g., router 110) can be determined by the process (e.g., process 190) on the different node based on the routing tables. A routing table is a data structure stored at a each router that indicates the end node address and a link at that particular router used to reach that address. The routing tables indicate that traffic to the IP address indicated by the source address of the data packet go through router 110. Therefore process 190 can determine that the data packet was received through a port on router 110. The router is then queried through ARP for the port ID of the port(e.g., the port MAC address) that is associated with the MAC or IP address of the device In step 330, an identity is determined for an entity that sent the data packet. Of all the identities included in the data packet, one or more identities are selected which can be associated with location in one or more enterprise databases available through the network. Many data packets sent from a user of a device identify that user or the device. For example, email from a user of a device identifies the user. Most users check their email several times daily and consequently send hundreds of data packets that include their email address in an email header. Similarly, VoIP sessions begin with a session setup that includes a VoIP phone number that is uniquely associated with an office Many users interact with a calendar server frequently, and consequently send data packets that include their personal calendar ID in an calendar header of a data packet. Other identifiers that are captured in various embodiments include a logon ID, an employee number, a social security number, and a password, among others.

It is assumed for purposes of illustration that server 180a is a database server for a light-weight directory access protocol (LDAP) well known in the art. LDAP is an Internet protocol that email, VoIP and other programs use to look up information from a server. It is further assumed that an enterprise calendar server (not shown) is also available on subnetwork 170.

During step 330, an email address or VoIP phone number or personal calendar ID is extracted from the data packet. Some data packets do not include identities that can be associated with location in any enterprise database; and such data packets are ignored by the heuristic mapping process 190. For example the sender's email address rjsmith@companyX.com is extracted from the data packet as an identity of an entity (the user) using the port. As another example the VoIP telephone set number 123-456-7890 is extracted from the data packet as an identity of an entity (the telephone set) using the port.

In step 340, a suggested physical location is determined based on the identity data. For example, based on the sender's email address rjsmith@companyX.com extracted from a data packet received on port 112a, a query is made of the enterprise LDAP server 180a. The email address is associated with Bob Smith. The same or subsequent query to the LDAP indicates that Bob is assigned to an office with certain coordinates (e.g., 9.1.2.2) where built-in jack 132a is. Thus the suggested location is 9.1.2.2 (jack 132a) for the device connected to port 112a.

In another example embodiment, the calendar ID R Smith007 for BOB is also determined by the same or different LDAP query. Based on the calendar entry, and the time that the data packet was received (2 PM, Jun. 9, 2006) it is determined that Bob had a meeting with Alice in her office. The same or subsequent query to the LDAP indicates that Alice is assigned to an office with certain coordinates (e.g., 9.1.3.3) where built-in jack 132b is. Thus the suggested location is 9.1.3.3 (jack 132b) for the device connected to port 112a.

In another example embodiment, based on the sender's VoIP phone number address 123-456-7890 extracted from a data packet received on port 112a, a query is made of the enterprise LDAP server 180a. The VoIP address is associated with Alice. The telephone set with number 123-456-7890 can move from office to office. It plugs into the office jack and connects with a Call Manager Server to obtain service at the new port. The same or subsequent query to the LDAP indicates that Alice is assigned to an office with certain coordinates (e.g., 9.1.3.3) where built-in jack 132b is. Thus the suggested location is 9.1.3.3 (jack 132b) for the device connected to port 112a.

In another example embodiment, the calendar ID AToby003 for Alice is also determined by the same or different LDAP query. Based on the calendar entry, and the time that the data packet was received (2 PM, Jun. 9, 2006) it is determined that Alice had a meeting with Bob in her office. Thus the suggested location is 9.1.3.3 (jack 132b) for the device connected to port 112a.

In step 350, the port is associated with the highest confidence location. Since the locations associated with users are not always the correct locations, the highest confidence location determination desirably corrects for unusual uses of the ports. At the same time however, the determination desirably accounts for changes as rooms are re-assigned for different uses. In the examples described for step 340, all possible in the same physical situation, the port 112a has had suggested physical locations that include both Bob's office (coordinates 9.1.2.2 with jack 132a) and Alice's office (coordinates 9.1.3.3 with jack 132*b*). Three out of four of the suggested locations are Alice's office. Thus, in this example embodiment, Alice's office is the best location to associate with the port 112*a*. In step 350 Alice's office location has the highest confidence as determined by the heuristic mapping process 190. As can be seen in FIG. 1B, Alice's office is in fact the correct location to associate with port 112*a*. In other embodiments, other ways of accessing confidence are used. A particular method for determining a highest confidence location that builds and fills port confidence data structure 200 is described in more detail in the next section with reference to FIG. 4.

In step 360, an action is performed based on the highest confidence location associated with a port. For example, when anomalous signals are received at port 112*a*, a query is sent to the heuristic mapping process 190, or to an application programming interface (API) for the data structure 200, which returns the highest confidence location at the time (Alice's office) for port 112*a*. Thus a technician is dispatched to Alice's office to inspect whether the device at that end is initiating the anomalous signals. Similarly, if an emergency signal is received through port 112*a*, then a query is sent to the heuristic mapping process 190 or data structure API which returns the highest confidence location at the time (Alice's office). Thus an emergency worker is dispatched to Alice's office.

In some embodiments, step 360 includes updating the enterprise LDAP data when the confidence gets high enough. For example, if Bob's email address dominates the traffic on port 112*a*, and at least one LDAP file indicates Jack is in a new location (e.g., Alice's old office), then it is determined that Bob moved into Alice's office and that change is propagated to the other LDAP data files.

3.2 Method at Location Confidence Process

FIG. 4 is a flow diagram that illustrates a method 400 for performing step 350 of the method of FIG. 3, according to an embodiment. Method 400 is thus an embodiment of step 350. In some embodiments, method 400 is performed by a separate process called a port confidence server with which the heuristic mapping server 190 communicates as a client.

In step 410, data is received that indicates the port and the suggested physical location. In some embodiments, the data also indicates a device connected to the port. For example, data is received that indicates port 112*a* on router 110, and the location 9.1.3.3 of Alice's office (at jack 132*a*). Note that this is a most probable result from step 340, arising from receiving an email data packet at port 112*a* from Alice's office with Alice's email identity as the sending email address.

In step 420, it is determined whether the port is already in the port confidence data structure 200. For example, it is determined whether there is a port record 220 with the MAC address of router 110 and relative address of port 112*a* in the port ID field 222. If not, control passes to step 422. In step 422 a port record is added to the data structure 200 for the port with neutral confidence. For example, record 220*a* is written with the MAC address of router 110 and the relative address of port 112*a* in the port ID field 222. The MAC address of device 121*b* (if included in the data structure and received in the data received during step 410) is written to a device ID field 223. The suggested location (e.g., Alice's room coordinates 9.1.3.3) is written to the primary physical location field 224 and the neutral confidence value (e.g., 100 in a scale from 0 to 200) is written to primary confidence field 225. The port record for port 112*a* is as listed in Table 1. Processing of this information is complete as indicated by passing control to step 490, the "done" state.

TABLE 1

Port record in Port Confidence Data Structure as first written.

| Port ID | Primary Location | Primary Confidence | Secondary Location | Secondary Confidence |
|---|---|---|---|---|
| Router 110 Port 112a | 9.1.3.3 (Alice's Office) | 100 | NULL | NULL |

If it is determined in step 420 that the port is already in the port confidence data structure 200, then control passes to step 430. In step 430, it is determined whether the suggested location matches an entry in the port record for this port. As used here, an entry is a pair of one physical location field and its associated confidence field. If there is a match, control passes to step 432. For example, when the next email message is sent by Alice from her office, data indicating her office and port 112*a* again passes to the port confidence server. This time port record for port 112*a* exists and contains the data listed in Table 1. The suggested location again is 9.1.3.3 and matches the value in the primary location field 225 (in the first entry of the port record). Thus, control passes to step 432.

In step 432, the confidence in this entry is incremented. That is, a confidence value in the confidence field of the entry is increased. In the illustrated embodiment, an increment of value 1 is used. In some other embodiments, other increments are used. As a result, the values in this port record are as given in Table 2. Control then passes to step 440.

TABLE 2

Port record in Port Confidence Data Structure as first incremented.

| Port ID | Primary Location | Primary Confidence | Secondary Location | Secondary Confidence |
|---|---|---|---|---|
| Router 110 Port 112a | 9.1.3.3 (Alice's Office) | 101 | NULL | NULL |

In order to allow the confidence server to gracefully migrate to new locations for devices attached to a port, it is advantageous not to allow the confidence value to become too large. For example, over a few years, a user can send hundreds of thousands of email packets. If a new person is connected to that port, it will take years before he can match that number and begin to have his location considered on a par with the former user. Thus a maximum confidence is defined; and the value in a confidence field is not allowed to exceed the maximum. Therefore, the increment is made only if the value in the confidence field is less than the maximum. The neutral and maximum values can be determined by experiment to give the port confidence server the appropriate behavior. For purpose of illustration it is assumed that the maximum value is 200 and the neutral value is 100.

If, during step 430, it is determined that the suggested location does not match an entry in the port record for this port, then control passes to step 434. For example, when the next email message is sent by Bob from Alice's office, data indicating his office as suggested location and port 112*a* passes to the port confidence server. The port record for port 112*a* does exist and contains the data listed in Table 2. The suggested location now is 9.1.2.2 (Bob's office) and does not match the value 9.1.3.3 in the primary location field 225 (in the first entry of the port record). Thus, control passes to step 434.

In step 434, the confidence in this entry is decremented. That is, a confidence value in the confidence field of the entry is decreased. In the illustrated embodiment a decrement of value 1 is used. In some other embodiments other decrements are used. As a result, the values in this port record are as given in Table 3. For example, after a one-time use of Alice's computer or her office jack by a visitor, the values are as listed in Table 3. Control then passes to step 440.

TABLE 3

Port record in Port Confidence Data Structure as first decremented.

| Port ID | Primary Location | Primary Confidence | Secondary Location | Secondary Confidence |
|---|---|---|---|---|
| Router 110 Port 112a | 9.1.3.3 (Alice's Office) | 100 | NULL | NULL |

It is also advantageous not to allow the confidence value to become too small or too negative. For example, a one-time use of Alice's computer by a visitor can cause that visitor's location to be associated with the port, as described below. After that use, subsequent uses by others will decrement the confidence of that visitor's location, as desired. Eventually large negative numbers could be produced that require large amounts of storage or lead to memory write errors. Thus a minimum confidence is set and the value in a confidence field is not allowed to dip below the minimum. Therefore, the decrement is made only if the value in the confidence field is above the minimum. The minimum value, like the neutral and maximum values, can be determined by experiment to give the port confidence server the appropriate behavior. For purpose of illustration it is assumed that the minimum is 0.

In step 440, it is determined whether there is another record entry, i.e. another pair of physical location field and associated confidence field with non-null values. If so, control passes back to step 430 to see if the suggested location matches the location in the next entry. At this point of the example, there is not another entry in the record (i.e., the secondary entry fields hold NULL values), and control passes to step 450.

In step 450 it is determined whether the suggested location matched any entry in the record. If so, control passes to step 452, to determine whether the highest confidence location has changed. Step 452 is described in more detail below at a later stage of the example. If it is determined in step 450 that the suggested location did not match any entry in the record, control passes to step 460. For example, the suggested location 9.1.2.2 for Bob's office did not match any entry in the record, as depicted in Table 3, so control passes to step 460 at this stage of the example.

In step 460 it is determined whether there is room to add another entry to this record. In some embodiments, any number of entries is allowed in each port record. In some embodiments, only the primary entry with the primary physical location field and primary confidence field is allowed. In the illustrated embodiment, a secondary entry with a secondary physical location field 228 and a secondary confidence field 229 is allowed. In embodiments with only a single entry allowed, then there is never room for a new entry; and step 460 is omitted, and control passes directly to step 470.

In step 470, it is determined whether the confidence value in the entry with the least confidence is less than a threshold. The threshold is a confidence value much less than the neutral value. By the time a confidence value for a location has reached this threshold it has been a disproportionately long time since an entity at this location has used the device. The associated location is not considered credible. A more recent location, represented by the suggested physical location received in step 410 is considered always preferable even if this is the first appearance of the suggested location. The threshold value can readily be determined by experiment to give the desired behavior. It is assumed for purposes of illustration that the threshold value is 10.

If it is determined in step 470 that the confidence value in the entry with the least confidence is less than the threshold, then control passes to step 464. In step 464, the entry with the least confidence is replaced by the suggested location with neutral confidence. If the confidence value in the entry with the least confidence is equal to or greater than the threshold, the suggested location is ignored, and the process is done, passing control to step 490. The previously stored location and associated confidence are retained.

In embodiments that only allow a primary entry, and with the values in the field listed in Table 3, the suggested location 9.1.2.2 for Bob's office is discarded and the stored location 9.1.3.3 for Alice's office is retained. However, if others continued to send emails from Alice's office with no activity from Alice, the confidence in Alice's location eventually drops to the threshold. The next email by Bob drops confidence in Alice's location below the threshold and Bob's location 9.1.2.2 replaces Alice's location 9.1.3.3 as the primary location during step 464. In such a situation, the contents of the port record are as indicated in Table 4. Note that there is no secondary entry in this port record that allows only one entry.

TABLE 4

Port record with one entry after 90 successive decrements.

| Port ID | Primary Location | Primary Confidence |
|---|---|---|
| Router 110 Port 112a | 9.1.2.2 (Bob's Office) | 100 |

In the illustrated embodiment, a secondary entry with a secondary physical location field 228 and a secondary confidence field 229 is allowed. Thus, in the illustrated embodiment, there is room in the record to add another entry, and control passes from step 460 to step 462. In step 462, an entry is added to the record for the suggested location with neutral confidence. Thus, after this step, the contents of the port record are as listed in Table 5. Neither location has higher confidence

TABLE 5

Port record in Port Confidence Data Structure after first appearance of Bob's office as a suggested location.

| Port ID | Primary Location | Primary Confidence | Secondary Location | Secondary Confidence |
|---|---|---|---|---|
| Router 110 Port 112a | 9.1.3.3 (Alice's Office) | 100 | 9.1.2.2 (Bob's Office) | 100 |

If it is determined in step 450 that the suggested location matched one of the locations in the port record, then at least one entry was incremented or decremented, and control passes to step 452. Control also passes to step 452 after step 462 and after step 464, both described above. In both steps 462 and 464 an entry with neutral confidence is inserted in the port record 220.

In step 452, it is determined whether a different entry than the primary entry has the highest confidence value. If not, then control passes to step 490 and the port confidence server process is done updating the data structure 200 based on the suggested physical location. However, if it is determined in step 452 that a different entry than the primary entry has the highest confidence value, then control passes to step 454. In step 454, the entry with the highest confidence value is made the primary entry.

Any method may be used to make the highest confidence entry the primary entry. In some embodiments, the different entry (e.g., the secondary entry) is made the primary entry by swapping the contents of its fields (e.g., the secondary physical location field and secondary confidence field) with the contents in the primary physical location field and primary confidence field, respectively. In some embodiments, the contents are not switched. Rather, an indicator of the primary entry is changed to indicate the different entry pair. For example, in some embodiments, a one-binary-digit flag (not shown) associated with each entry pair of fields is ON for the primary entry and OFF for the other entries (e.g., the secondary entry). During step 454, the flags are changed so that the former primary entry flag is now OFF and the different entry flag is now ON. In another embodiment a pointer (not shown) is included in each port record 220 and holds the memory address of the entry that has the highest confidence.

In the example for which contents are listed in Table 5, the different entry (Bob's Office) does not have the highest confidence value, so control passes to step 490 to end the processing of the suggested location. The contents of the data structure remain as listed in Table 5.

Several hours later, after dozens of email data packets and VoIP data packets from Alice that bear her identities, and some from Bob while his calendar indicates he is in Alice's office, the contents of the port record for port 112a are as listed in Table 6. It is assumed that three dozen (36) such data packets were sent by Alice after the email sent by Bob at a time when Bob's calendar is blank.

TABLE 6

Port record in Port Confidence Data Structure after three dozen data packets that bear Alice's identity.

| Port ID | Primary Location | Primary Confidence | Secondary Location | Secondary Confidence |
|---|---|---|---|---|
| Router 110 Port 112a | 9.1.3.3 (Alice's Office) | 136 | 9.1.2.2 (Bob's Office) | 64 |

Thus the port record shows a preponderance of confidence in Alice's office and relatively little confidence that Bob's office is connected to port 112a on router 110.

Using the methods 300 and 400, a current map of intermediate node port to physical location is maintained as devices add and move in the network. Any application that uses this information can now obtain it by querying the heuristic mapping process 190 or directly querying the port confidence data structure 200.

4.0 IMPLEMENTATION

Hardware Overview

Figure 5:
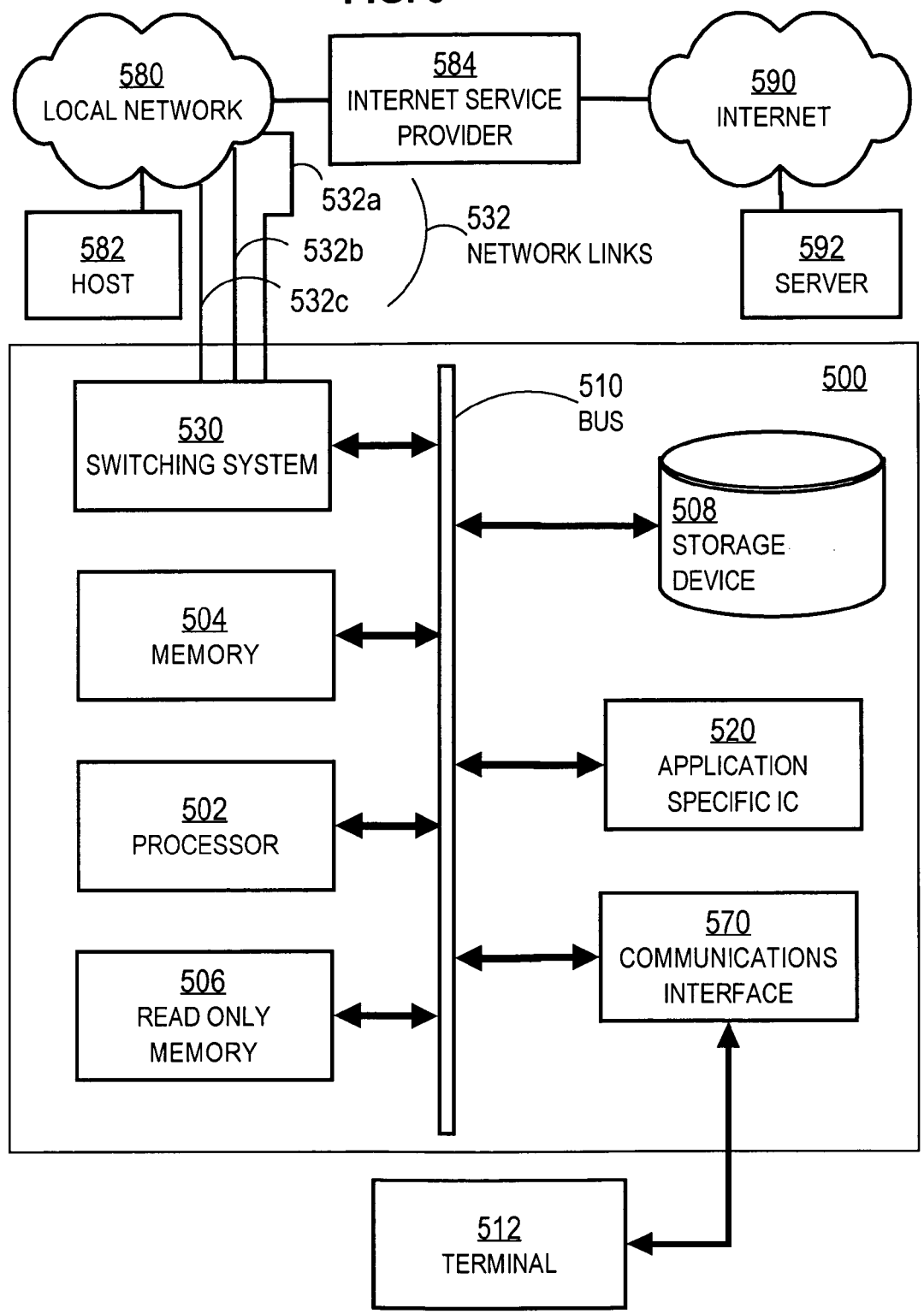
FIG. 5 is a block diagram that illustrates a computer system upon which an embodiment of the invention may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention.

Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for associating a physical location with a device connected to a network interface on an intermediate network device, comprising the steps of:
   receiving a data packet from a the device connected to a network;
   determining, by one or more processors, based on data in the data packet, a particular network interface that received the data packet on a particular intermediate network node that received the data packet earlier than any other intermediate network node in the network;
   determining, by one or more processors, an identity for an entity that originated the data packet based on the data in the data packet;
   determining, by one or more processors, a possible physical location for the entity based on the identity; and
   associating with the particular network interface a highest confidence location for the device based on the possible physical location of the entity,
   determining, by one or more processors, whether the current location data indicates the possible physical location;
   if it is determined that the current location data indicates the possible physical location, then determining whether current confidence data associated with the current location data indicates a current confidence value less than a predetermined confidence value; and
   if it is determined that the current confidence data indicates the current confidence value is less than the predetermined confidence value, then increasing the current confidence value indicated by the current confidence data.

2. The method as recited in claim 1, wherein the entity is a person and the possible physical location determined for the person comprises a predetermined physical location where the person is typically physically located.

3. The method as recited in claim 1, said step of determining the particular network interface on the particular intermediate network node further comprising determining a media access control (MAC) address for the particular network interface.

4. The method as recited in claim 1, said step of determining the particular network interface on the particular intermediate network node further comprising determining the particular intermediate network node based on routing data for the network and an Internet Protocol (IP) source address in the data packet.

5. The method as recited in claim 1, wherein the data packet is an email data packet and said step of determining the identity for the entity further comprises determining a source email address in the email data packet.

6. The method as recited in claim 1, wherein the data packet is a data packet used to set up a session for Internet telephony and said step of determining the identity for the entity further comprises determining a source Voice over Internet Protocol (VoIP) telephone number in the data packet.

7. The method as recited in claim 1, further comprising:
   sending to an enterprise database a query data packet that includes ID data that indicates the identity of the entity; and
   in response to sending the query, receiving a response data packet that includes data that indicates the possible physical location for the entity.

8. The method as recited in claim 1, further comprising:
   sending to an enterprise database a query data packet that includes ID data that indicates the identity of the entity and time data that indicates a time related to a time when the data packet is received at the particular intermediate network node; and
   in response to sending the query data packet, receiving a response data packet that indicates the possible physical location for the entity at the time indicated by the time data.

9. The method as recited in claim 1, further comprising:
   determining whether particular port data that indicates the particular network interface is stored in a particular data structure; and
   if it is determined that the particular port data that indicates the particular network interface is not stored in the particular data structure, then performing the steps of:
   storing the particular port data that indicates the particular network interface in the particular data structure;

storing primary location data that indicates the possible physical location in association with the particular port data;

storing primary confidence data that indicates neutral confidence in association with the primary location data; and associating the particular network interface with a highest confidence location indicated in the primary location data.

10. The method as recited in claim 9, further comprising:

if it is determined that the particular port data that indicates the particular network interface is stored in the particular data structure, then performing the steps of determining whether old location data associated with the particular port data does not indicate the possible physical location, and if it is determined that the old location data does not indicate the possible physical location, then performing the steps of determining whether old confidence data associated with the old location data indicates an old confidence value greater than a minimum confidence value, and if it is determined that the old confidence data indicates the old confidence value is greater than the minimum confidence value, then decrementing the old confidence value indicated by the old confidence data.

11. The method as recited in claim 1, further comprising:

sending a location suggestion data packet that includes first data that indicates the particular network interface and second data that indicates the possible physical location to a location confidence process that determines the highest confidence location based on the second data and any former locations associated with the particular network interface.

12. A method for associating a physical location with a device connected to a network interface on an intermediate network device, comprising the steps of:

receiving a location suggestion data packet that includes first data that indicates a particular network interface and second data that indicates a possible physical location for a device directly connected to the particular network interface;

associating with the particular network interface a highest confidence location for the device based on the possible physical location and any former locations associated with the particular network interface;

determining whether old location data associated with the particular port data does not indicate the possible physical location, and if it is determined that the old location data does not indicate the possible physical location, determining whether old confidence data associated with the old location data indicates an old confidence value greater than a confidence threshold value, and if it is determined that the old confidence data indicates the old confidence value is greater than the given confidence threshold value, then reducing the old confidence value indicated by the old confidence data.

13. The method as recited in claim 12, said step of associating with the particular network interface a highest confidence location further comprising the steps of:

determining whether particular port data that indicates the particular network interface is stored in a particular data structure;

if it is determined that the particular port data that indicates the particular network interface is not stored in the particular data structure, then performing the steps of:

storing the particular port data that indicates the particular network interface in the particular data structure;

storing primary location data that indicates the possible physical location in association with the particular port data;

storing primary confidence data that indicates neutral confidence in association with the primary location data; and associating the particular network interface with the highest confidence location indicated in the primary location data.

14. An article of manufacture including a computer-readable medium carrying one or more sequences of instructions for associating a physical location with a device connected to a network interface on an intermediate network device, wherein execution of the one or more sequences of instructions by one or more processors causes the one or more processors to perform the steps of:

receiving a data packet from the device connected to a network;

determining, based on data in the data packet, a particular network interface that received the data packet on a particular intermediate network node that received the data packet earlier than any other intermediate network node in the network;

determining an identity for an entity that originated the data packet based on the data in the data packet;

determining a possible physical location for the entity based on the identity;

associating with the particular network interface a highest confidence location for the device based on the possible physical location of the entity, wherein the identity is associated with the possible physical location in a data source that is accessible over the network;

determining whether the current location data associated with the particular network interface indicates the possible physical location;

if it is determined that the current location data indicates the possible physical location, then increasing or maintaining the current confidence value associated with the current location data.

15. The article of manufacture as recited in claim 14, wherein execution of the one or more sequences of instructions further causes the one or more processors to carry out the steps of:

monitoring different packet transmission activities from the user;

determining a possible physical location of the user based on the different packet transmission activities; and using the possible physical location of the user to identify a location for a cable jack at an end of a cable link coupled to the particular network interface.

16. The article of manufacture as recited in claim 14, further comprising:

determining a first confidence value associated with a first possible physical location of a first user according to data packet transmission patterns received from the first user over the particular network interface;

determining a second confidence value associated with a second possible physical location of a second user according to data packet transmission patterns from the second user over the particular network interface; and comparing the first confidence value with the second confidence value and using one of the first possible physical location and the second possible physical location with a highest confidence value as the highest confidence location for the device.

17. The article of manufacture as recited in claim 14, further comprising determining the particular intermediate network node based on routing data for the network and an Internet Protocol (IP) source address in the data packet.

18. The article of manufacture as recited in claim 14, wherein the data packet is an email data packet and said step of determining the identity for the entity further comprising determining a source email address in the email data packet.

19. The article of manufacture as recited in claim 14, wherein the data packet is used to set up a session for Internet telephony and said step of determining the identity for the entity further comprises determining a source Voice over Internet Protocol (VoIP) telephone number in the data packet.

20. The article of manufacture as recited in claim 14, wherein the data source is an enterprise database and said step of determining the possible physical location for the entity further comprises the steps of:
   sending to the enterprise database a query data packet that includes ID data that indicates the identity of the entity; and
   in response to sending the query data packet, receiving a response data packet that includes data that indicates the possible physical location for the entity.

21. The article of manufacture as recited in claim 14, wherein the data source is an enterprise database and the entity is a mobile entity and said step of determining the possible physical location for the entity further comprises the steps of:
   sending to the enterprise database a query data packet that includes ID data that indicates the identity of the entity and time data that indicates a time related to a time when the data packet is received at the particular intermediate network node; and
   in response to sending the query, receiving a response data packet that includes data that indicates the possible physical location for the entity at the time indicated by the time data.

22. The article of manufacture as recited in claim 14, said step of associating with the particular network interface the highest confidence location further comprising the steps of:
   determining whether particular port data that indicates the particular network interface is stored in a particular data structure;
   if it is determined that the particular port data that indicates the particular network interface is not stored in the particular data structure, then performing the steps of:
   storing particular port data that indicates the particular network interface in the particular data structure;
   storing primary location data that indicates the possible physical location in association with the particular port data;
   storing primary confidence data that indicates neutral confidence in association with the primary location data; and
   associating the particular network interface with a highest confidence location indicated in the primary location data.

23. The article of manufacture as recited in claim 22, wherein execution of the one or more sequences of instructions further causes the one or more processors to carry out, after the step of incrementing the current confidence value indicated by the current confidence data, the steps of:
   determining whether the current location data is the primary location data, and if it is determined that the current location data is not the primary location data, then performing the steps of determining whether an incremented confidence value indicated by the current confidence data exceeds a primary confidence value indicated by the primary confidence data;
   if it is determined that the incremented confidence value exceeds the primary confidence value, then performing the steps of:
   exchanging the primary location data and the current location data; and
   exchanging the primary confidence data and the current confidence value.

24. The article of manufacture as recited in claim 22, said step of associating with the particular network interface a highest confidence location further comprising the steps of:
   if it is determined that the particular port data that indicates the particular network interface is stored in the particular data structure, then performing the steps of determining whether old location data associated with the particular port data does not indicate the possible physical location, and
   if it is determined that the old location data does not indicate the possible physical location, then performing the steps of determining whether old confidence data associated with the old location data indicates an old confidence value greater than a minimum confidence value, and
   if it is determined that the old confidence data indicates the old confidence value is greater than the minimum confidence value, then decrementing the old confidence value indicated by the old confidence data.

25. The article of manufacture as recited in claim 23, wherein execution of the one or more sequences of instructions further causes the one or more processors to carry out, after the step of decrementing the old confidence value indicated by the old confidence data, the steps of:
   determining whether the old location data is the primary location data; and
   if is determined that the old location data is the primary location data, then performing the steps of:
   determining whether a different confidence value indicated by different confidence data for different location data from the primary location data exceeds a decremented confidence value indicated by the primary confidence data, and
   if it is determined that the different confidence value exceeds the decremented confidence value, then performing the steps of:
   exchanging the primary location data and the different location data, and
   exchanging the primary confidence data and the different confidence value.

26. The article of manufacture as recited in claim 24, after the step of decrementing the old confidence value indicated by the old confidence data, further comprising the steps of:
   determining whether the old location data is the primary location data; and
   if is determined that the old location data is the primary location data, then performing the steps of determining whether a decremented confidence value indicated by the primary confidence data is less than a reliability threshold confidence value; and
   if it is determined that the decremented confidence value is less than the reliability threshold confidence value, then performing the steps of:
   storing primary location data that indicates the current location, and
   storing primary confidence data that indicates neutral confidence.

27. The article of manufacture as recited in claim 24, wherein execution of the one or more sequences of instructions further causes the one or more processors to carry out, after the step of decrementing the old confidence value in the old confidence data, the steps of:
  determining whether any location data associated with the particular port data indicates the possible physical location; and
  if is determined that no location data associated with the particular port data indicates the possible physical location, then performing the steps of:
  storing secondary location data that indicates the possible physical location in association with the particular port data, and
  storing secondary confidence data that indicates neutral confidence in association with the secondary location data.

28. The article of manufacture as recited in claim 24, wherein execution of the one or more sequences of instructions further causes the one or more processors to carry out the steps of:
  determining whether additional secondary location data may be stored in association with the particular port data; and
  storing the additional secondary location data and storing secondary confidence data only if it is determined that the additional secondary location data may be stored in association with the particular port data.

29. The article of manufacture as recited in claim 14, wherein said step of associating with the particular network interface a highest confidence location further comprising the step of sending a location suggestion data packet that includes first data that indicates the particular network interface and second data that indicates the possible physical location to a location confidence process that determines the highest confidence location based on the second data and any former locations associated with the particular network interface.

30. An apparatus for associating a physical location with a device connected to a network interface on an intermediate network device, comprising:
  a network interface coupled for communicating therewith a first data packet;
  one or more processors;
  a computer-readable medium; and
  one or more sequences of instructions stored in the computer-readable medium, which, when executed by the one or more processors, causes the one or more processors to carry out the steps of:
  receiving through the network interface a location suggestion data packet that includes first data that indicates a particular network interface and second data associated with a possible physical location for a the device connected to the particular network interface;
  identifying a highest confidence location for the device based on the possible physical location for the device and any former locations associated with the particular network interface;
  determining a first confidence value associated with a first possible physical location of a first user according to packet transmission patterns received from the first user over the particular network interface;
  determining a second confidence value associated with a second possible physical location of a second user according to data packet transmission patterns from the second user over the particular network interface; and
  comparing the first confidence value with the second confidence value and using one of the first possible physical location and the second possible physical location with a highest confidence value as the highest confidence location for the device.

31. The apparatus as recited in claim 30, said step of identifying the highest confidence location further comprising the steps of:
  determining whether particular port data that indicates the particular network interface is stored in a particular data structure;
  if it is determined that the particular port data that indicates the particular network interface is not stored in the particular data structure, then performing the steps of:
  storing the particular port data that indicates the particular network interface in the particular data structure;
  storing primary location data that indicates the possible physical location in association with the particular port data;
  storing primary confidence data that indicates neutral confidence in association with the primary location data; and
  associating the particular network interface with the highest confidence location indicated in the primary location data.

32. The apparatus as recited in claim 31, wherein execution of the one or more sequences of instructions further causes the one or more processors to carry out, after the step of incrementing the current confidence value in the current confidence data, the steps of:
  determining whether the current location data is the primary location data, and if it is determined that the current location data is not the primary location data, then performing the steps of determining whether an incremented confidence value indicated by the current confidence data exceeds a primary confidence value indicated by the primary confidence data, and
  if it is determined that the incremented confidence value exceeds the primary confidence value, then performing the steps of exchanging the primary location data and the current location data, and exchanging the primary confidence data and the current confidence value.

33. The apparatus as recited in claim 31, further comprising the steps of:
  if it is determined that the particular port data that indicates the particular network interface is stored in the particular data structure, then performing the steps of determining whether old location data associated with the particular port data does not indicate the possible physical location, and
  if it is determined that the old location data does not indicate the possible physical location, then performing the steps of determining whether old confidence data associated with the old location data indicates an old confidence value greater than a minimum confidence value, and
  if it is determined that the old confidence data indicates the old confidence value is greater than the minimum confidence value, then decrementing the old confidence value indicated by the old confidence data.

34. The apparatus as recited in claim 33, wherein execution of the one or more sequences of instructions further causes the one or more processors to carry out, after the step of decrementing the old confidence value in the old confidence data, the steps of:
  determining whether the old location data is the primary location data; and
  if is determined that the old location data is the primary location data, then performing the steps of determining whether a different confidence value indicated by different confidence data for different location data from the primary location data exceeds a decremented confidence value indicated by the primary confidence data; and if it is determined that the different confidence value exceeds the decremented confidence value, then performing the steps of exchanging the primary location data and the different location data, and exchanging the primary confidence data and the different confidence value.

35. The apparatus as recited in claim 33, wherein execution of the one or more sequences of instructions further causes the one or more processors to carry out, after the step of decrementing the old confidence value in the old confidence data, the steps of:

determining whether the old location data is the primary location data, and if is determined that the old location data is the primary location data, then performing the steps of determining whether a decremented confidence value indicated by the primary confidence data is less than a reliability threshold confidence value, and if it is determined that the decremented confidence value is less than the reliability threshold confidence value, then performing the steps of storing primary location data that indicates the current location, and storing primary confidence data that indicates neutral confidence.

36. The apparatus as recited in claim 33, wherein execution of the one or more sequences of instructions further causes the one or more processors to carry out, after the step of decrementing the old confidence value in the old confidence data, the steps of:

determining whether any location data associated with the particular port data indicates the possible physical location; and if is determined that no location data associated with the particular port data indicates the possible physical location, then performing the steps of:

storing secondary location data that indicates the possible physical location in association with the particular port data; and storing secondary confidence data that indicates a neutral confidence value in association with the primary location data.

37. The apparatus as recited in claim 36, wherein:

execution of the one or more sequences of instructions further causes the one or more processors to carry out the step of determining whether additional secondary location data may be stored in association with the particular port data; and said steps of storing secondary location data and storing secondary confidence data are performed only if it is determined that the additional secondary location data may be stored in association with the particular port data.

* * * * *

UNITED STATES PATENT AND TRADEMARK OFFICE
CERTIFICATE OF CORRECTION

| | | |
|---|---|---|
| PATENT NO. | : 7,738,456 B2 | Page 1 of 1 |
| APPLICATION NO. | : 11/500738 | |
| DATED | : June 15, 2010 | |
| INVENTOR(S) | : Toebes et al. | |

It is certified that error appears in the above-identified patent and that said Letters Patent is hereby corrected as shown below:

At column 17, line 56, please replace "from a the device" with --from the device--.
At column 20, line 46, please replace "different packet" with --different data packet--.
At column 20, line 49, please replace "different packet" with --different data packet--.
At column 21, line 47, please replace "storing particular" with --storing the particular--.
At column 21, line 64, please replace "and if is" with --and if it is--.
At column 22, line 29, please replace "claim 23" with --claim 24--.
At column 22, line 36, please replace "if is" with --if it is--.
At column 22, line 56, please replace "if is" with --if it is--.
At column 23, line 9, please replace "if is" with --if it is--.
At column 23, line 52, please replace "for a the" with --for the--.
At column 23, line 60, please replace "packet" with --data packet--.
At column 24, line 66, please replace "if is" with --if it is--.
At column 25, line 18, please replace "if is" with --if it is--.
At column 26, line 7, please replace "if is" with --if it is--.

Signed and Sealed this
Twenty-eighth Day of February, 2012

David J. Kappos
*Director of the United States Patent and Trademark Office*